US009317567B1

(12) United States Patent
Lu et al.

(10) Patent No.: US 9,317,567 B1
(45) Date of Patent: Apr. 19, 2016

(54) SYSTEM AND METHOD OF COMPUTATIONAL SOCIAL NETWORK DEVELOPMENT ENVIRONMENT FOR HUMAN INTELLIGENCE

(71) Applicant: HRL Laboratories, LLC, Malibu, CA (US)

(72) Inventors: Tsai-Ching Lu, Wynnewood, PA (US); David L. Allen, Thousand Oaks, CA (US); Hankyu Moon, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 201 days.

(21) Appl. No.: 13/747,312

(22) Filed: Jan. 22, 2013

Related U.S. Application Data

(63) Continuation-in-part of application No. 13/029,073, filed on Feb. 16, 2011, now Pat. No. 9,147,273.

(60) Provisional application No. 61/589,772, filed on Jan. 23, 2012.

(51) Int. Cl.
   *G06F 17/30* (2006.01)
(52) U.S. Cl.
   CPC .............................. *G06F 17/30539* (2013.01)
(58) Field of Classification Search
   CPC .......... G06F 17/30539; G06F 2216/03; G06F 17/30985; G06F 17/30286
   USPC .......................................... 707/776, 780, 775
   See application file for complete search history.

(56) References Cited

U.S. PATENT DOCUMENTS

| 2004/0093331 | A1* | 5/2004 | Garner | G06N 5/022 |
| 2010/0306166 | A1* | 12/2010 | Pantel | G06N 5/041 706/55 |
| 2013/0151632 | A1* | 6/2013 | Chodavarapu | G06Q 50/01 709/206 |

OTHER PUBLICATIONS

Yin et al, "Truth Discovery with Multiple Conflicting Information Providers on the Web", IEEE Transactions on Knowledge and Data Engineering, vol. 20, No. 6, Jun. 2008, pp. 769-808.*
Lin et al, "Text Cube: Computing IR Measures for Multidimensional Text Database Analysis", 2008 Eighth IEEE International Conference on Data Mining, pp. 906-910.*
Gupta et al, "Heterogeneous Network-Based Trust Analysis: A Survey", SIGK"D Explorations, vol. 13, Issue 1, pp. 54-71.*

(Continued)

*Primary Examiner* — Rehana Perveen
*Assistant Examiner* — Loc Tran
(74) *Attorney, Agent, or Firm* — Tope-McKay & Associates

(57) ABSTRACT

Described is a system for supporting human intelligence analysis. The system detects changes in social relations among users within a dynamic information network and enables understanding of a current social situation in the dynamic information network through multiple integrated modules. An active network mining module identifies incomplete data that is related to at least one change in the social relations and resolves conflicting and missing data in the dynamic information network. A relevant network discovery module constructs a relevant network from hidden relations within the dynamic information network. An information-aware social network module constructs an information-aware social network using the relevant network, then classifies and prioritizes items of interest to provide an assessment of a current social situation to a user.

18 Claims, 10 Drawing Sheets

(56) References Cited

OTHER PUBLICATIONS

Wang et al, "Mining Advisor-Advisee Relationships from Research Publication Networks", Copyright 2010 ACM 978-1-4503-0055-1, 10 pages.*
Bryant, "A Classification of Consensus Methods for Phylogenetics," (DIMACS Series in Discrete Mathematics and Theoretical Computer Science) 1991, 21 pages, School of Computer Science and Depatrment of Mathematics and Statistics, McGill University, Montreal, Quebec.
Clauset, et al., "Hierarchical Structure and the Prediction of Missing links in Networks," Supplementary Information, May 2008, 5 pages, www.nature.com/nature.
Newman, et al., "Finding and Evaluating Community Structure in Networks," Physical Review E 69, 026113 (2004), 15 pages, The American Physical Society.
Palla, et al., "Uncovering the Overlapping Community Structure of Complex Networks in Nature and Society," Nature, vol. 435/9, Jun. 2005/doi:10.1038/nature03607; pp. 814-818, Nature Publishing Group.
Clauset, et al., "Structural Inference of Hierarchies in Networks," Proceedings of the 23rd International Conference on Machine Learning, Oct. 9, 2006, 8 pgs., Pittsburgh, PA.
Frey, et al., "Clustering by Passing Messages Between Date Points," Science AAAS, vol. 315, Feb. 16, 2007, pp. 971-976, www.sciencemag.org.
Rosvall, et al., "An Information-Theoretic Framework for Resolving Community Structure in Complex Networks," PNAS, May 1, 2007, pp. 7327-7331, vol. 104, No. 18, www.pnas.org/cgi/doi/10.1073.
Newman, et al., "Mixture Models and Exploratory Analysis in Networks," PNAS, Jun. 5, 2007, pp. 9564-9569, vol. 104, No. 23, www.pnas.org/cgi/doi/10.1073.
Viswanathan, et al., "Levy flights and Superdiffusion in the Context of Biological Encounters and Random Searches," Science Direct, Physics of Life Reviews 5, 2008, pp. 133-150, Elsevier B.V., www.sciencedirect.com.
Kroonenberg, "Applied Multiway Data Analysis," John Wiley & Sons, Inc., Publication, Hoboken, New Jersey, 2008, 19 pgs. [553 pgs.].
Gonzalez, et al., "Understanding Individual Human Mobility Patterns," Nature, vol. 453, Jun. 5, 2008, pp. 779-782, Nature Publishing Group.
Kolda, et al., "Tensor Decompositions and Applications," Siam Review, Jun. 10, 2008, pp. 1-47.
Hofman, et al., "A Bayesian Approach to Network Modularity," Physics, data-an, Jun. 23, 2008, 4 pages, Columbia University, New York, N.Y.
Wang, et al., "Understanding the Spreading Patterns of Mobile Phone Viruses," Science AAAS, vol. 324, May 22, 2009, pp. 1071-1076, Washington, D.C.
Halary, et al., "Network Analyses Structure Genetic Diversity in Independent Genetic Worlds," PNAS, vol. 107, No. 1, Jan. 5, 2010, pp. 127-132.
Halary, et al., "Supporting Information," 17 pages, www.pnas.org/cgi/content/short/10.1073/pnas.0908978107, Jan. 5, 2010.
David Allen, Hankyu Moon, and Tsai-Ching Lu. Hierarchical random graph for networks with multiple edge attributes. DMIN11, Jul. 18-21, 2011, http://www.dmin--2011.com/.
I. Bhattacharya and L. Getoor. Collective entity resolution in relational data. ACM Transactions on Knowledge Discovery from Data (TKDD), 1(1): 5, 2007.
David M. Blei, Thomas L. Griffiths, Michael I. Jordan, and Joshua B. Tenenbaum. Hierarchical topic models and the nested chinese restaurant process. In NIPS, 2003.
Mustafa Bilgic and Lisa Getoor. Active inference for collective classification. In Twenty-Fourth Conference on Artifical Intelligence (AAAI), 2010.
S. Brin and L. Page. The anatomy of a large-scale hypertextual web search engine. In Proc. 7th Int. World Wide Web Conf, (WWW'98), pp. 107-117, Brisbane, Australia, Apr. 1998.
Aaron Clauset, Cristopher Moore, and M. E. J. Newman. Hierarchical structure and the prediction of missing links in networks. Nature, 453 (7191): 98-101, 2008.
M. Garmon, A. Aue, S. Corston-Oliver, and E. Ringger. Pulse: Mining customer opinions from free text. Advances in Intelligent Data Analysis VI, pp. 121-132, 2005.
M. Hu and B. Liu. Mining and summarizing customer reviews. In Proceedings of the tenth ACM SIGKDD international conference on Knowledge discovery and data mining, pp. 168-177. ACM New York, NY, USA, 2004.
G. Iniguez, J. Kertesz, K.K. Kaski, and RA Barrio. Opinion and community formation in coevolving networks, 2009.
G. Jeh and J. Widom. Simrank: A measure of structural-context similarity. In Proceedings of the eighth ACM SIGKDD international conference on Knowledge discovery and data mining, p. 543. ACM, 2002.
J. Leskovec, D. Huttenlocher, and J. Kleinberg. Signed networks in social media. Proc. 28th CHI, 2010.
U. Luxburg. A tutorial on spectral clustering, Statistics and Computing, 17 (4): 416, 2007.
B. Pang and L. Lee. Opinion mining and sentiment analysis, Foundations and Trends in Information Retrieval, 2 (1-2): 1-135, 2008.
M Rattigan, M Maier, and D Jensen. Exploiting network structure for active inference in collective classification, Technical report, University of Massachusetts Amherst, 2007.
Alessandro Vespignani. Predicting the behavior of techno-social systems. Science, 325 (5939): 425-428, 2009.
Xiaoxin Yin, Jiawei Han, and Philip S. Yu. Object distinction: Distinguishing objects with identical names. In ICDE, pp. 1242-1246. IEEE, 2007.
X. Yin, J. Han, and P. S. Yu. Truth discovery with multiple conflicting information providers on the web. IEEE Trans. Knowledge and Data Eng., 20: 796-806, 2008.
Yintao Yu, Cindy Xide Lin, Yizhou Sun, Chen Chen, Jiawei Man, Binbin Liao, Tianyl Wu, ChengXiang Zhai, Duo Zhang, and Bo Zhao, Inextcube: Information network-enhanced text cube. In Proceedings of the 35th International Conference on Very Large Data Bases (VLDB 2009), 2009.
C. Wang, J. Han, Y. Jia, J. Tang, D. Zhang, Y. Yu, and J. Guo. Mining advisor-advisee relationships from research publication networks. In Proc. 2010 ACM SIGKDD Conf. on Knowledge Discovery and Data Mining (KDD'10), Washington D.C., Jul. 2010.
D. Zhang, C. Zhai, and J. Han. Topic cube: Topic modeling for OLAP on multidimensional text databases. In Proc. 2009 SIAM Int. Conf. on Data Mining (SDM'09), Sparks, NV, Apr. 2009.
L. Zhuang, F. Jing, and X.Y. Zhu. Movie review mining and summarization. In Proceedings of the 15th ACM international conference on Information and knowledge management, p. 50, ACM, 2006.
Yizhou Sun, Jiawei Han, Peixiang Zhao, Zhihun Yin, Hong Cheng, and Tianyl Wu. Rankclus: integrating clustering with ranking for heterogeneous information network analysis. In EDBT'09: Proceedings of the 12th International Conference on Extending Database Technology, pp. 565-576, 2009. ISBN 978-1-60558-422-5.
Yizhou Sun, Yintao Yu, and Jiawei Han. Ranking-based clustering of heterogeneous information networks with star network schema. In KDD'09: Proceedings of the 15th ACM SIGKDD international conference on Knowledge discovery and data mining, pp. 797-806, 2009. ISBN 978-1-60558-495-9.
M. E. J. Newman, Networks: An Introduction, Oxford University Press, 2010. Ch 4, Ch 11, Ch 12.
Pearl, Judea, Probabilistic Reasoning in Intelligent Systems: Networks of Plausible Inference (2nd ed.), San Francisco, CA: Morgan Kaufmann. ISBN 1-55860-479-0, 1988, Ch 4.
Ashish Kapoor and Eric Horvitz. Breaking boundaries: Active information acquisition across learning and diagnosis. In Neural Information Processing Systems, 2009.
M.S. Kim and J. Han. A particle-and-density based evolutionary clustering method for dynamic networks. In Proc. 2009 Int. Conf. on Very Large Data Bases (VLDB'09), Lyon, France, Aug. 2009.

* cited by examiner

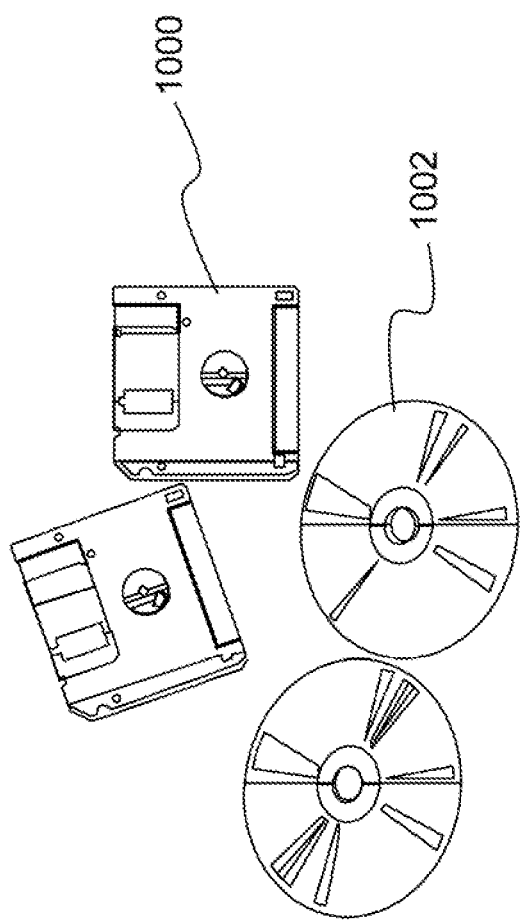

SYSTEM AND METHOD OF COMPUTATIONAL SOCIAL NETWORK DEVELOPMENT ENVIRONMENT FOR HUMAN INTELLIGENCE

CROSS-REFERENCE TO RELATED APPLICATIONS

This is a Continuation-in-Part application of U.S. Non-Provisional application Ser. No. 13/029,073, filed on Feb. 16, 2011, entitled, "System and Method for Modeling and Analyzing Data Via Hierarchical Random Graphs." This application is ALSO a. Non-Provisional patent application of U.S. Provisional Application No. 61/589,772, filed in the United States on Jan. 23, 2012, entitled, "System and Method of Computational Social Network Development Environment for Human intelligence."

BACKGROUND OF THE INVENTION (1) Field of Invention

The present invention relates to a system for supporting human intelligence analysis and, more particularly, to a system for supporting human intelligence analysis by enabling high fidelity understanding of a local and regional social situation.

(2) Description of Related Art

HUMINT, an abbreviation of the words human intelligence, refers to intelligence gathering by means of interpersonal contact. In other words, intelligence is derived from information collected and provided by human sources. HUMINT activities typically consist of interrogations and conversations with persons having access to pertinent information. Good intelligence management begins with the proper determination of what is considered useful information. Data collected through HUMINT activities must be evaluated and transformed into a usable form and often stored for flame use.

HUMINT collection and analysis is currently a laborious and manual process prone to information loss and missed opportunities. Providing automated support to users (e.g., military personnel) requires addressing many operational and technical challenges. Relevant research addressing uncertain and incomplete network data is primarily focused on sampling issues of node attributes for classification. Several references (see List of Cited Literature References, Literature Reference Nos. 4 and 14) deal with optimal sampling that takes graph structure into account, but they only handle the issue of sampling nodes for labeling. Entity resolution approaches (see Literature Reference Nos. 2 and 16) deal with ambiguous names, but do not deal with purposely misleading information.

Works on link analysis (see Literature Reference No. 5) can be explored to extract relevant structure; however, both are limited to homogenous networks. Additional works (see Literature Reference No. 10) applied similarity extraction before spectral methods (see Literature Reference No. 12) to handle heterogeneous networks, but were slow at handling the heterogeneous networks. Existing work on opinion summarization generated structured summaries (see Literature Reference Nos. 7, 8, and 20) for products based on customer review, but they are limited to specific topics.

Furthermore, mutual influence of techno-social systems has been overviewed (see Literature Reference No. 15), and dynamic network agent-based models were studied for opinion and community co-evolution (see Literature Reference No. 9). However, these studies were limited to theoretical modeling and did not include learning from empirical network data. Works in on-line social media have modeled social influence in connecting people to their friends, followers, and collaborators (see Literature Reference No. 13), but were limited to positive links. Another reference (see Literature Reference No. 11) proposed an edge sign prediction problem to model social influence for trusts with positive and negative links, but it was limited to static links with no neutral links.

Each of the prior methods discussed above exhibit limitations that make them incomplete. The methods have significant limitations in (1) handling uncertain, missing, and conflicting data, (2) handling untrustworthy or deceptive data (3) providing relevant information and contexts to validate and acquire new information, and (4) tracing information trends to assist in knowledge acquisition from prioritized targets. The invention described herein addresses the shortcomings in current practices of HUMINT data collection and analysis by going beyond traditional topological approaches and, instead, emphasizing, the network of modeling, of trustworthy relation analysis, mission-based social understanding, and adaptability to dynamic situations.

SUMMARY OF THE INVENTION

The present invention relates to a system for supporting human intelligence analysis comprising one or more processors and a memory having instructions such that when the instructions are executed, the one or more processors perform Operations of first detecting changes in a plurality of social relations among users within a dynamic information network comprising a plurality of data and enabling understanding of a current social situation in the dynamic information network through a plurality of integrated modules. The plurality of integrated modules comprises an active network mining module. The active network mining module identifies incomplete data that is related to at least one change in the plurality of social relations, and the active network mining module further resolves conflicting and missing data in the dynamic information network to derive a set of trustworthiness relations using link analysis. Additionally, a relevant network discovery module constructs a relevant network, comprising, nodes and clusters of nodes, from hidden relations within the dynamic information network. An info anon-aware social network module constructs an information-aware social network using the relevant network. The information-aware social network comprises a plurality of items of interest. Furthermore, the information-aware social network module classifies and prioritizes the plurality of items of interest to provide an assessment of a current social situation to a user.

In another aspect, the system further comprises a storage and query module to enable efficient data querying and summarization. The storage and query module comprises a graph-enhanced database for storing the dynamic information network; and a multi-dimensional information cube model integrating text data and graphical data from the dynamic information network.

In another aspect, the active, network mining module utilizes an information imbalance measure to prioritize data for efficient data collection. The system further performs operations of querying and extracting a set of perceived importance scores of a node from the multi-dimensional information cube model; querying and extracting a set of rank scores of the node from the multi-dimensional information cube model; and computing the information imbalance measure of a node from the set of perceived importance scores of the node and the set of rank scores of the node. The information imbalance measure reflects an inconsistency within and between the set of perceived importance scores of the node and the set of rank scores of the node.

In another aspect, the system further performs operations of employing a mode-switching model for trust and confidence analysis. The mode-switching model comprises a network of linked nodes and network edges, and the network edges represent instances of truth telling behaviors or instances of lying behaviors. Initial weights on a trustworthiness of linked nodes are derived using the set of perceived importance scores and the set of rank scores. Negative weights are assigned to linked nodes corresponding to lying behaviors, and positive weights are assigned to linked nodes corresponding to truth telling behaviors. The weights are propagated and the trustworthiness is consolidated by an iterative enhancement process.

In another aspect, the relevant network discovery module utilizes a role discovery algorithm to perform simultaneous clustering and ranking to identify which clusters of nodes and nodes are most relevant based on their ranking within the cluster.

In another aspect, the information-aware social network module comprises an information-aware social network which views network evolution as a result of applying a sequence of operators over some nodes or clusters of an initial network. A social influence reasoning sub-module identifies, classifies, and ranks items of interest by considering relation drifts between the items of interest using a social influence propagation algorithm. Relation drifts are quantified by monitoring temporal distributions of exchanged information. An active information acquisition sub-module provides an expected value of acquiring new data and exploiting information using network pattern search with holistic decision-theoretic selective sampling.

As can be appreciated by one in the art, the present invention also comprises a method for causing a processor to perform the operations described herein.

Finally, the present invention also comprises a computer program product comprising computer-readable instruction means stored on a non-transitory computer-readable medium that are executable by one or more computers having, a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 10 is an illustration of a computer program product according to the present invention.

DETAILED DESCRIPTION

Figure 1:
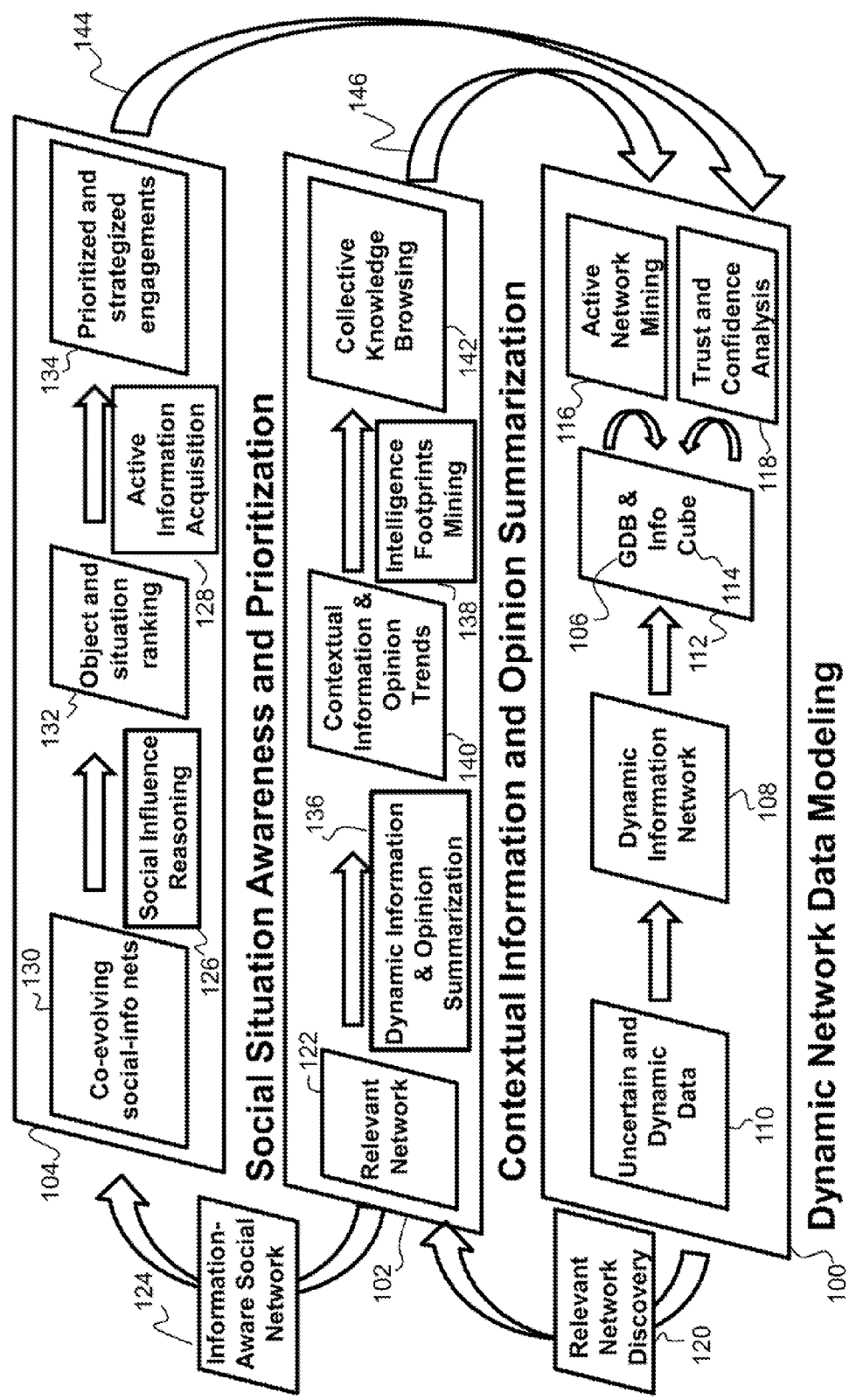
FIG. 1 is an illustration of a three-tiered framework to assist reasoning, and prediction for human intelligence (HUMINT) data collection and analysis according to the present invention.

The present invention relates to a system for supporting human intelligence analysis and, more particularly, to a system for supporting human intelligence analysis by enabling high fidelity understanding of a local and regional social situation. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended, to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being, limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed, in this specification, (including any accompanying claims, abstract, and drawings) ma be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing, the invention in detail, first a list of cited literature references used in the description is provided. Subsequently, a description of various principal aspects of the present invention is provided. Finally, specific details of the present invention are provided to give an understanding of the specific aspects.

(1). List of Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. David Allen, Hankyu Moon, and Tsai-Ching Lu. Hierarchical random graph for networks with multiple edge attributes. Technical report, HRL, 2009,
2. I. Bhattacharya and L. Getoor. Collective entity resolution in relational data, ACM Transactions on Knowledge Discovery from Data (TKDD), 1 (1): 5, 2007.
3. David Ni. Blei, Thomas I. Griffiths, Michael I. Jordan, and Joshua B. Tenenbaum, Hierarchical topic models and the nested chinese restaurant process. In MPS, 2003.
4. Mustafa Bilgic and Lise Getoor, Active inference for collective classification. In *Twenty-Fourth Conference on Artificial Intelligence (AAAI)*, 2010.
5. S. Brin and L. Page. The anatomy of a large-scale hypertextual web search engine. In Proc. 7th Int. World Wide Web Conf. (WWW'98), pages 107-117, Brisbane, Australia, April 1998.
6. Aaron Clauset, Cristopher Moore, and M. E. J. Newman. Hierarchical structure and the prediction of missing links in networks. *Nature,* 453 (7191): 98-101, 2008.
7. M. Gamon, Aue, S. Corston-Oliver, and E. Ringger. Pulse: Mining customer opinions from free text. *Advances in Intelligent Data Analysis VI*, pages 121-132, 2005.
8. M. Hu and B. Liu. Mining and summarizing customer reviews. In *Proceedings of the tenth ACM SIGKDD international conference on Knowledge discovery and data mining*, pages 168-177. ACM New York, N.Y., USA, 2004.
9. G. Iniguez, J. Kertész, K. K. Kaski, and R A. Barrio. Opinion and community formation in coevolving networks. 2009,
10. G. Jell and J. Widom. Simrank: A measure of structural-context similarity. In *Proceedings of the eight ACM SIGKDD international conference on Knowledge discovery and data mining*, page 543. ACM, 2002,
11. J. Leskovec, D. Huttenlocher, and J. Kleinberg. Signed networks in social media. *Proc 28th CHI,* 2010,
12. U. Luxburg. A tutorial on spectral clustering. *Statistics and Computing,* 17 (4): 416, 2007.
13. B. Pang and L, Lee. Opinion mining and sentiment analysis. *Foundations and Trends in information Retrieval;* 2 (1-2): 1-135, 2008,
14. M Rattigan, M Maier, and D Jensen. Exploiting network structure for active inference in collective classification. Technical report, University of Massachusetts Amherst, 2007.
15. Alessandro Vespignani, Predicting the behavior of techno-social systems. *Science,* 125 (5939): 425-428, 2009,
16. Xiaoxin Yin, Jiawei Han, and Philip S. Yu. Object distinction: Distinguishing objects with identical names. In *ICDE*, pages 1242-1246. IEEE, 2007,
17. X. Yin, J. Han, and P. S. Yu. Truth discovery with multiple conflicting information providers on the web, *IEEE Trans. Knowledge and Data Eng.,* 20: 796-808, 2008,
18. Yintao Yu, Cindy Xide Lin, Yizhou Sun, Chen Chen, Jiawei Han, Binbin Liao, Tianyi Wu, ChengXiang Zhai, Duo Zhang, and Bo Zhao. inextcube: Information network-enhanced text cube. In *Proceedings of the 35th International Conference on Very Large Data Bases (VLDB* 2009), 2009,
19. C. Wang, J. Han, Y. Jia. J. Tang, D. Zhang, Y. Yu, and J. Guo. Mining advisor-advisee relationships from research publication networks. In *Proc.* 2010 *ACM SIGKDD Conf.* *on Knowledge Discovery and Data Mining (KDD '10)* Washington D.C., July 2010,
20. D. Zhang, C. Thai, and J. Han. Topic cube: Topic modeling for OLAP on multidimensional text databases. In Proc. 2009 SIAM Int. Conf on Data Mining (SDM'09), Sparks, Nev., April 2009.
21. L. Zhuang, F. Jing, and X. Y, Zhu. Movie review mining and summarization. In *Proceedings of the 15th ACM international conference on Information and knowledge management*, page 50. ACM, 2006.
22. Yizhou Sun Jiawei Han, Peixiang Zhao, Zhijun Yin, Hong Cheng, and Tianyi Wu. Rankclus: integrating clustering with ranking for heterogeneous information network analysis. In EDBT'09: Proceedings of the 12th international Conference on Extending Database Technology, pages 565-576, 2009, ISBN 978-1-60558-422-5.
23. Yizhou Sun, Yintao Yu, and Jiawei Han. Ranking-based clustering of heterogeneous information networks with star network schema. In KDD'09; Proceedings of the 15th ACM SIG KDD international conference on Knowledge discovery and data mining, pages 797-806, 2009. ISBN 978-1-60558-495-9,
24. M. E. J. Newman, Networks: An Introduction, Oxford University Press, 2010.
25. Pearl, Judea, Probabilistic Reasoning in Intelligent Systems: Networks of Plausible Inference (2nd ed.). San Francisco, Calif.: Morgan Kaufmann, ISBN 1-55860-479-0, 1988.
26. Ashish Kapoor and Eric Horvitz. Breaking boundaries: Active information acquisition across learning and diagnosis. In Neural Information Processing Systems, 2009.
27. M. S. Kim and J. Han. A particle-and-density based evolutionary clustering method for dynamic networks. In Proc 2009 Int. Conf. on Very Large Data Bases (VLDB'09), Lyon, France, August 2009.

(2) Principal Aspects

The present invention has three "principal" aspects. The first is a system for supporting human intelligence analysis. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for supporting, human intelligence analysis. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer-

(3) Specific Details

The present invention is a system, method, and computer program product for supporting human intelligence (HUMINT) analysis by enabling high fidelity understanding of a local and regional social situation. HUMINT refers to intelligence gathering through means of interpersonal contact, such as interrogations, and conversations with persons having, access to pertinent information. The invention supports the collect-update-analyze-prioritize process of HUMINT by rapidly detecting changes in social relations on the field. In HUMINT, the collection step requires planning of who-what-when-where-how to gather the information for the investigation. The collection is executed in the field to collect data, which requires future updates to ensure the up-to-date status. The collected information is then sent back to headquarters to be aggregated and analyzed for the investigation. The result of analysis is then prioritized into actionable items for the next iteration of the HUMINT process. HUMINT collection and analysis is currently a laborious and manual process prone to information loss and missed opportunities. Providing automated support requires addressing many operational and technical challenges. The end result is to build a Computational Social Network Analysis (CSNA) Development Environment. CSNA enhances an analysts' ability to process and understand large volumes of dynamically evolving data and to provide users access to previously acquired information, thus allowing them to make more informed decisions and to improve their ability to acquire new knowledge. In doing so, the amount of information lost in the current collect-analyze-update-prioritize process is reduced and knowledge is retained.

The three main challenges in supporting HUMINT process are: uncertain and incomplete data, size and complexity, and dynamic network structure. Each of these challenges is addressed with focused technology. Specifically, the invention comprises three aspects: active network mining, relevant network discovery, and an information-aware social network. The first aspect, active network mining, includes an information imbalance method that identifies missing data containing potentially crucial information of changes in social relations. Additionally, active network ruining consists of a trust and confidence analysis method, which resolves conflicting and misleading information from unreliable sources by deriving trustworthiness relations using link analysis. In the second aspect, relevant, network discovery, dynamic information, opinion summarization, and intelligence footprint mining are integrated to construct a relevant network from hidden relations using role discovery and time-constrained probabilistic models. Finally, information-aware social network is a method that provides the modeling of co-evolution of the social network and the concepts and opinions. As the network affects the information flow, the information reciprocally influences the network. These three focused technologies are linked, as will be described in detail below.

(3.1) Dynamic Network Modeling

As depicted in FIG. 1, CSNA is a three-tiered framework to assist reasoning and prediction for HUMINT data collection and analysis. The three tiers include: Dynamic Network Data Modeling 100, Contextual Information and Opinion Summarization 102, and Social Situation Awareness and Prioritization 104. The CSNA development environment of the present invention delivers customizable graph-theoretic social-analytic software toolkits for seamless integration, which will be described in further detail below. The environment provides automated support for the HUMINT Update-Analyze-Prioritize process with software modules incorporated into the following toolkits. Storage and Query, Modeling, Classification and Prioritization, and Interface, which are integrated into the three-tiered framework.

The Storage and Query toolkit comprises a graph-enhanced database (GDB) 106 for storing dynamic information networks 108, which accommodate uncertain and dynamic data 110, and assessed information. A graph lath Cube querying and building engine 112 provides effective updates and accesses of requested information. The dynamic information networks 108 are stored and queried using the GOB 106 and an Info Cube 114 (of the graph info Cube querying and building engine 112) which highlight the multi-dimensional aspects of the data enabling, efficient data querying and summarization. The GDB 106 also serves to record collected information in electronic form (i.e., instead of paper form to effectively reduce information loss) and retain knowledge. The representation and retrieval technologies reduce data complexity and uncertainty to facilitate further analysis.

The Info Cube 114 is built from probabilistic topic modeling (see Literature Reference No. 3). It is constructed based on a text dimension in a multi-dimensional text database and a hierarchical topic tree, which can be either given by domain experts or learned from text through hierarchical topic models (see Literature Reference No. 3). The contents stored in a cell of an Info Cube 114 can be designed to represent the measure of text in the cell in various ways. For instance, the contents can be constrained by values on both the topic dimension and the standard dimensions, which can be regarded as the context of the text in the corresponding cell.

The Modeling toolkit comprises an active network mining engine 116, TruthFinder analyzer engine (depicted as trust and confidence analysis 118 in FIG. 1), and relevant network mining engine (depicted as relevant network discovery 120 in FIG. 1). Scatter information sources (e.g., news, blogs, expert reports, and ontology) and HUMINT are modeled as a dynamic information network 108, which is mined, by the active network mining engine 116 to resolve conflicting and missing data, and assessed by the TruthFinder analyzer engine (trust and confidence analysis 118) to provide the trustworthiness of network data. The relevant network mining engine (relevant network discovery 120) takes in mission specifications and/or analysis queries to extract relevant networks 122 from the GDB 106 using the graph Info Cube querying and building engine 112.

The active network mining engine 116 was developed to address the challenge of incomplete data. Real-world social networks contain information gaps due to limited sampling over population, attributes, and temporal dimensions. The TruthFinder analyzer engine (trust and confidence analysis 118) addresses the challenge of false and misleading data. Real-world social networks of HUMINT often come from sources which may provide inaccurate and even intentionally deceptive information, which can misdirect the analysis and decision process. In particular, the active network mining engine 116 mitigates the issue of crucial information missed due to sparse data collection processes by assessing the balance of sampled information about individuals. The TruthFinder analyzer engine (trust and confidence analysis 118) resolves conflicting and misleading information from unreliable or deceptive information sources by deriving trustworthiness relations between the individuals and knowledge. Both technologies are built on dynamic information networks 108, which accommodate dynamically changing and multi-attributed/heterogeneous relational data (i.e., uncertain and dynamic data 110). Each of these technologies will be described in further detail below.

The Classification & Prioritization toolkit consists of an information-aware social network modeling engine 124, a social influence reasoning engine 126, and an active information acquisition engine 128. The information-aware social network modeling engine 124 takes in the relevant network 122, along with mission specifications and relevant data in the GDB 106, to discover evolution regularity of socio-info reciprocal influences (depicted as co-evolving social info nets 130 in FIG. 1) for constructing information-aware social networks. The social influence reasoning engine 126 takes in information-aware social networks and classifies items of interests (i.e., object and situation ranking 132) for providing social situation assessments of static and dynamic networks. Finally, the active information acquisition engine 128 prioritizes over items of interests to provide prioritized and strategized engagements 134 as sell as relevant cues.

The Interface toolkit consists of a dynamic information and opinion summarization engine 136 and an intelligence footprint mining engine 138. The dynamic information and opinion summarization engine 136 will use relevant networks 122 as the basis and integrate disparate information and diverse opinions into a structured summary i.e., contextual information and opinion trends 140) that gives analysts a concise overview of current situations. The intelligence footprint mining engine 138 mines over interaction logs to improve workflows and leverage expertise sharing (i collective knowledge browsing 142).

Logs and traces of analysts interactions (represented by arrow 144) in using the modules of the Contextual Information and Opinion Summarization 102 tier, and the new information (represented by 146) collected by executing the prioritized tasks in the Social Situation Awareness and Prioritization 104 tier are then used to update and provide new information to the uncertain and dynamic data 110 in the Dynamic Network Data Modeling 100 tier.

Figure 2:
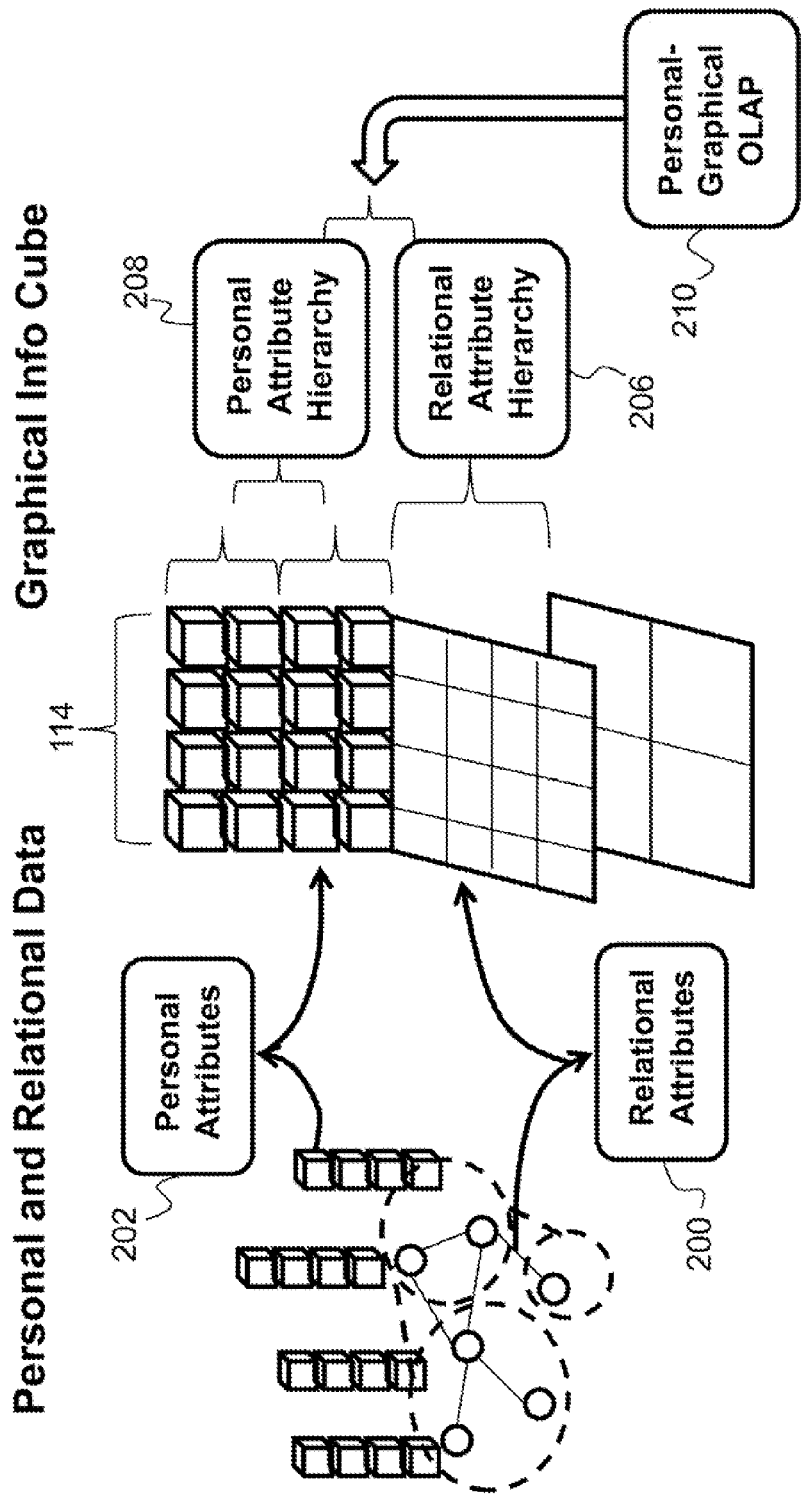
FIG. 2 is an illustration of an information cube (Info Cube) model integrating both text and graphical data according to the present invention.

FIG. 2 illustrates an information cube 114 (Info Cube) model integrating both text and graphical data. To accommodate graph mining, the hierarchical (topic) organization of graphic relation attributes is imposed on the tensor-like multi-dimensional representation of entity data and graph data. Both relational attributes 200 and personal attributes 202 are integrated into a multi-dimensional Info Cube 114. For example, a set of relational attributes 200, such as "parent-child", "siblings", and "spouse", can be organized to a relational attribute hierarchy 206 (e.g., "family relations: relations by birth", "family relations: relation by marriage"). Additionally, a set of personal attributes 202 is organized into a personal attribute hierarchy 208. Such hierarchical organization enables structured queries on the information network. Unstructured text can also contain relational data, and the relational topics can also be organized from the Topic. Cube method (see. Literature Reference No. 20). An Info Cube 114 that captures both multi-dimensional entity features and multi-dimensional relational features enables standard online analytical processing (OLAP) operations in terms of both relational attributes 200 and personal attributes 204 (i.e., a personal-graphical OLAP 210).

Figure 3:
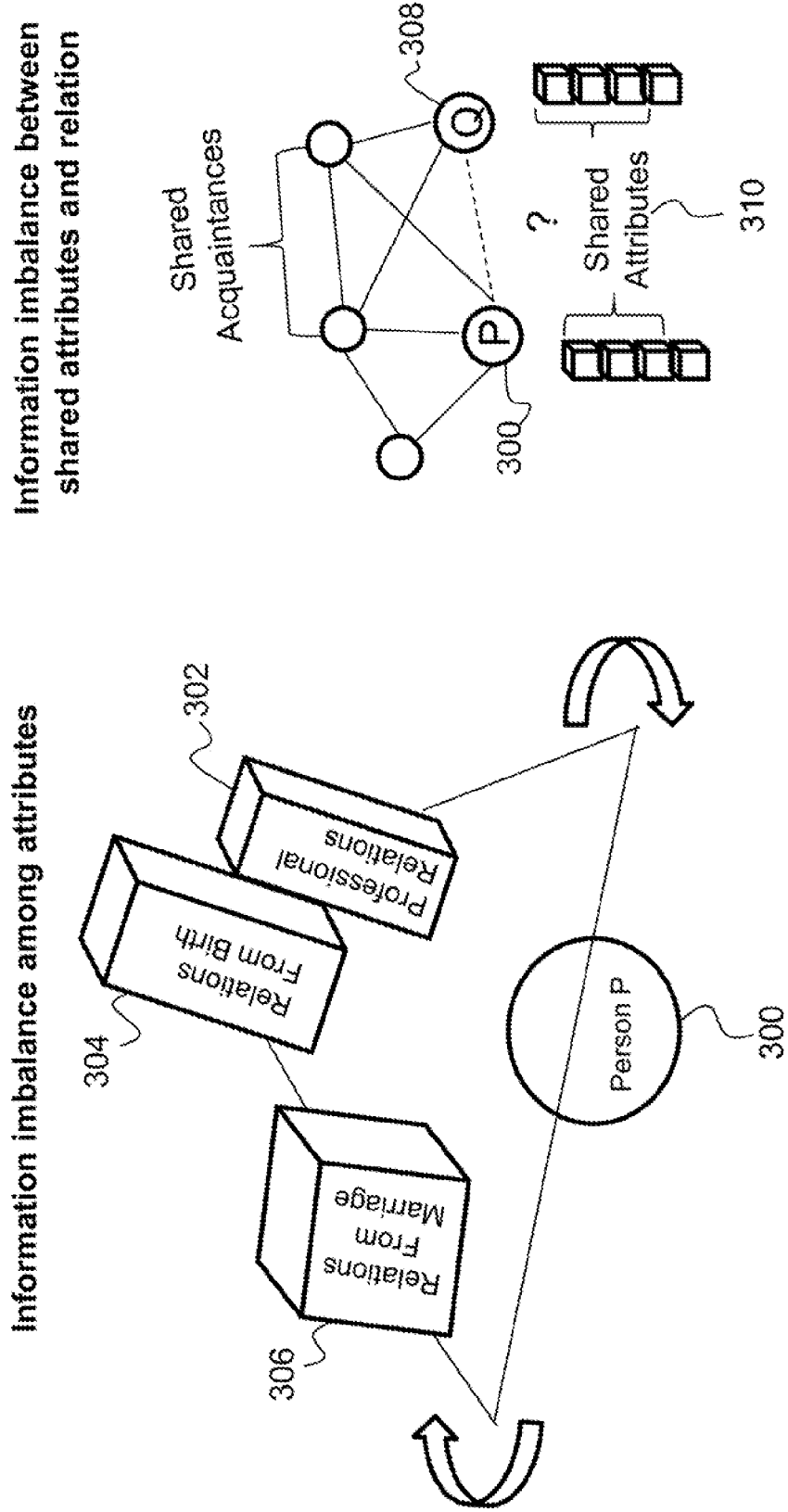
FIG. 3 is an illustration of an information imbalance measure according, to the present invention.

The sampling bias from the data collection process of HUMINT spans three different kinds of data dimensions including population dimension, temporal dimension, and attribute dimension. The active network mining engine (depicted as element 116 in FIG. 1) introduces a notion referred to as "information imbalance". It is a local measure of the bias over the three data dimensions. A non-limiting example of examining the population and attribute dimensions is presented in FIG. 3. In this example, information was collected about a person P 300 related to his professional relations 302 and family relations from birth 304; however, no information was collected for person P's 300 relations from marriage 306. Because of this lack of information, further analysis may miss crucial links to person P's 300 personal acquaintances, such as person Q 308, and shared attributes 310 between person P 300 and person Q 308. The data collection for an important individual may also miss certain periods of time (i.e., a temporal dimension). Thus, filling in such data can have much more potential value than collecting more data from other "balanced" subjects.

The information imbalance score of a node is computed from two different sets of quantities: (1) perceived importance scores of the node (e.g., a religious figure may have higher political influence than economic influence); and (2) graphic centrality ranks of the node computed for different attribute dimensions (e.g., family-friends rank versus co-worker rank). The information imbalance score reflects the inconsistency within and between the set of perceived importance scores and the set of rank scores. These quantities are extracted from the constructed Info Cube using appropriately structured queries for different attribute dimensions. The system then prompts the analyst to record the information imbalance scores so that later data collection or analysis can take them into account, Prioritizing the data based on the information imbalance score makes further information collection more efficient.

To address the challenge of false and misleading data, the work of TruthFinder (see Literature Reference No. 17) was extended to HUMINT analysis, where the information collected about the same person or event Often tells completely different stories. The TruthFinder model assists in identifying collection errors or unintentional misinformation. However, when a person deliberately provides Use information, the model assigns a very low trustworthiness to the source, which can be used to analyze other facts they have provided. This introduces an undesirable effect of discounting many collected facts, which propagate to further higher-level analysis. Because such a person may provide truthful answers to non-essential facts, a mode-switching model truth telling mode versus lying mode) is applied in the present invention to extend the TruthFinder model.

Figure 4:
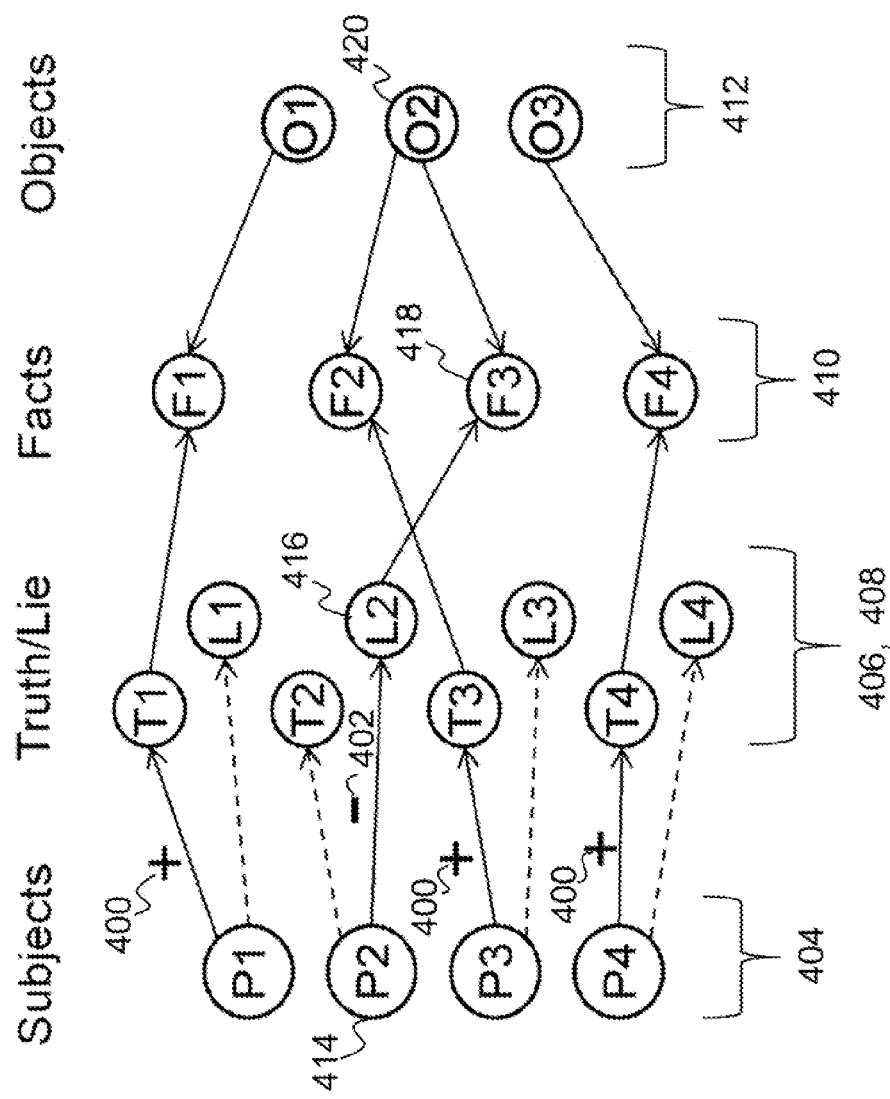
FIG. 4 is an illustration of a mode-switching model for trust and confidence analysis according to the present invention.

FIG. 4 illustrates the mode-switching model for the trust and confidence analysis module (depicted as element 118 in FIG. 1). The truth telling behavior assigns positive (+) 400 and negative (−) 402 weights to the "truth-telling" and "lie" links, respectively. Then, the weights propagate and consolidate the trustworthyness by an iterative enhancement process with weight-propagation and consolidation across the information network. A non-limiting example of such an iterative enhancement process is loop-belief propagation (see Literature Reference No. 25), but other instances of weight-propagation and consolidation methods are possible. As illustrated in FIG. 4, the model is built using four types of nodes: (i) the information sources, or subject (P) nodes 404; (ii) truth (T) nodes 406 and lie (L) nodes 408; (iii) stated facts (IF) 410 on different objects; and (iv) the corresponding objects (O) 412 (e.g., people or events). Referring to FIG. 4, P1, P2, P3, and P4 represent the subject nodes 404; T1, T2, T3, and T4 represent truth nodes 406; L1, L2, L3, and L4 denote lie nodes 408; F1, F2, F3, and F4 denote filets 410 nodes; and O1, O2, and O3 represent objects 412 nodes. The network edges represent instances of truth telling or lying behaviors. For instance, when subject P2 414 provided a false (L2 416) statement F3 418 about an object O2 420, then these nodes were linked.

Unlike the original TruthFinder model, the analysis in the present invention starts with available prior truth telling history, and uses the set of perceived importance scores and the set of rank scores, described above, to derive initial weights on the trustworthiness of the stated facts and information sources. The lying behavior assigns negative (−) 402 values to the corresponding link. Then it propagates and consolidates the trustworthiness by an iterative enhancement process with weight-propagation and consolidation across the information network.

(3.2) Contextual Information and Opinion Summarization

In the following section, the method to extract contextual information and opinion summarization from network data in the form of an Info Cube in GDB is described. In particular, the challenges in relevant and hidden relations, as well as information disparity and opinion diversity of real-world social network data are addressed. In the present invention, algorithms were developed, for discovering roles and relations by extending time-constrained probabilistic graph models (TPFG) (see Literature Reference No. 19). The algorithms incorporate machine learning techniques to analyze features and properties of the nodes and links in the network based on topological structures of the networks with a small set of user-specified rules and/or training examples. There are many hidden roles (e.g., supervisor-supervise in an organization) in real-world social networks. A role discovery algorithm assists in the identification of hidden relationships among people, organizations, and/or events, such that one can extract a non-trivial portion of the relevant sub-networks with the newly augmented structures.

To induce, relevant network fragments from an existing network, the present invention utilizes a mission-specific approach to cluster and rank nodes and relations for constructing mission relevant networks. The algorithm is built upon the iNextCube framework (see Literature Reference No. 18) to perform simultaneous authoritative clustering and ranking for identifying which clusters and nodes are most relevant to the mission, based on their ranking within the cluster. RankClus/NetClus (see Literature Reference Nos. 22 and 23) is extended into Dynamic RankClus/NetClus (DyNetClus) to simultaneously rank and cluster over dynamic heterogeneous networks to identify nodes and relations with respect to mission information, historical data and analysis granularity.

Figure 5:
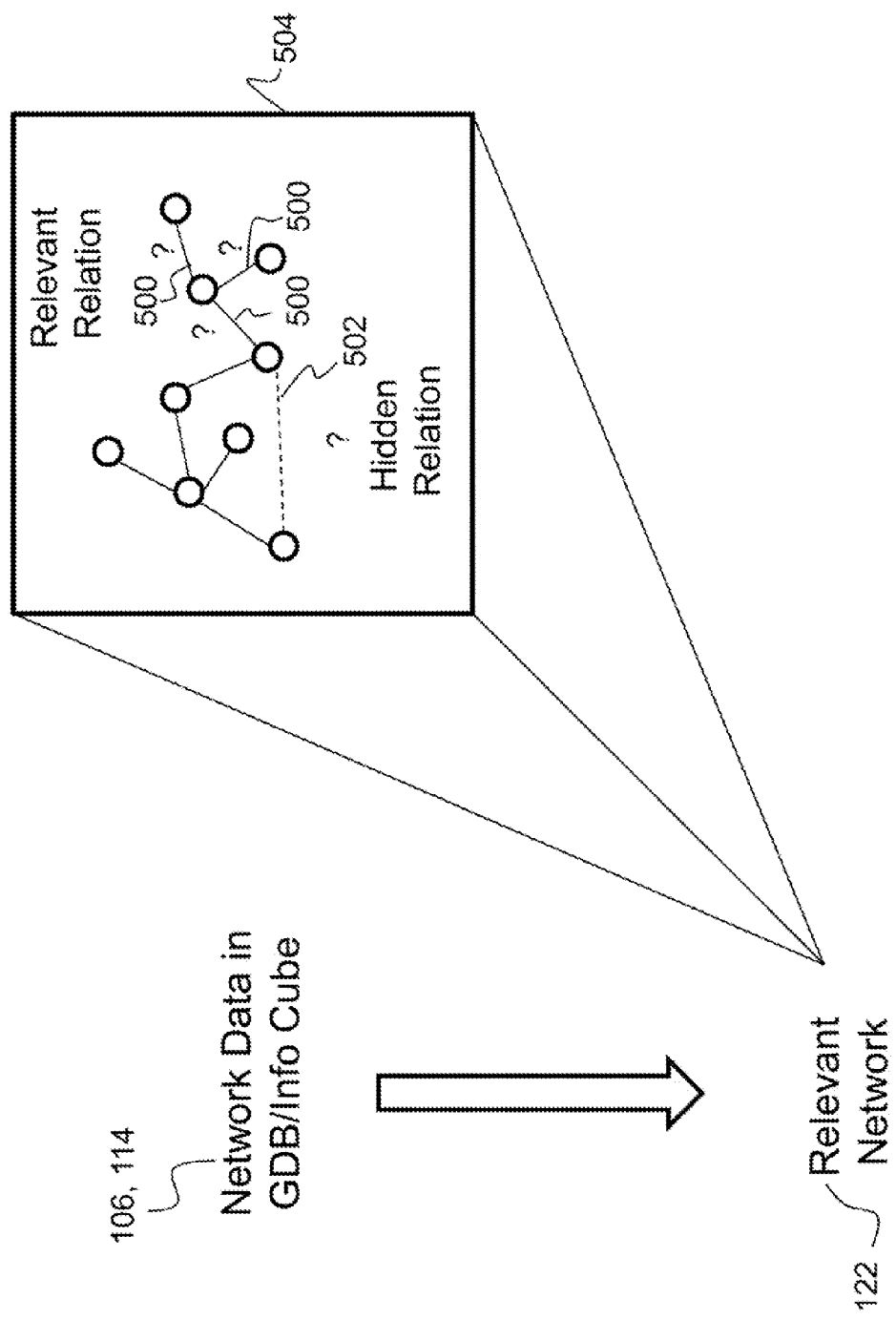
FIG. 5 is an illustration of relevant network discovery according to the present invention.

As shown in FIG. 5, the present invention is used to identify a relevant network 122 from network data in a GDB 106/Info Cube 114. DyNetClus extracts existing relevant relations 500, and the role discovery algorithm discovers hidden relevant relations 502 in a cluster of nodes 504 from the relevant network 122, As a non-limiting example, the algorithm of time-constrained probabilistic factor graph model (see Literature Reference No. 19) was used for role discovery.

Relevant network discovery addresses size and complexity challenge by reducing the network size. By iteratively improving clustering via ranking and ranking via clustering, meaningful relevant network structures are derived according to analysis granularity and missions.

(3.3) Social Situation and Prioritization

Reasoning and prediction in a dynamic network structure is the main challenge for providing deeper social situation awareness and prioritization. Real-world social networks contain reciprocal influences where evolving social relations influence how information diffuses, which in turn influences the evolution of social relations. Relations in such co-evolving social-information networks may drift or become stale over time. Further, roles may shift in response to events. Such hidden changes result in ambiguity and, inevitably, impact the ability to identify, classify and rank targets of interest as friendly, neutral or hostile. Furthermore, there is no prioritization in existing systems for resolving such ambiguity.

To address these challenges, the present invention provides the following technical innovations: (1) an information-aware social network which provides a unifying generative modeling of social and information co-evolution of clusters, and their corresponding concept hierarchy to enable reasoning and prediction in time and event driven network evolutions; (2) social influence reasoning which provides a ranked list of targets by identifying and classifying their roles, statuses, and relationships using social balance and status theory with influence-passing algorithms; and (3) active information acquisition which provides users with the expected value of disambiguation using network pattern search with holistic decision-theoretic selective sampling criterion.

Figure 6:
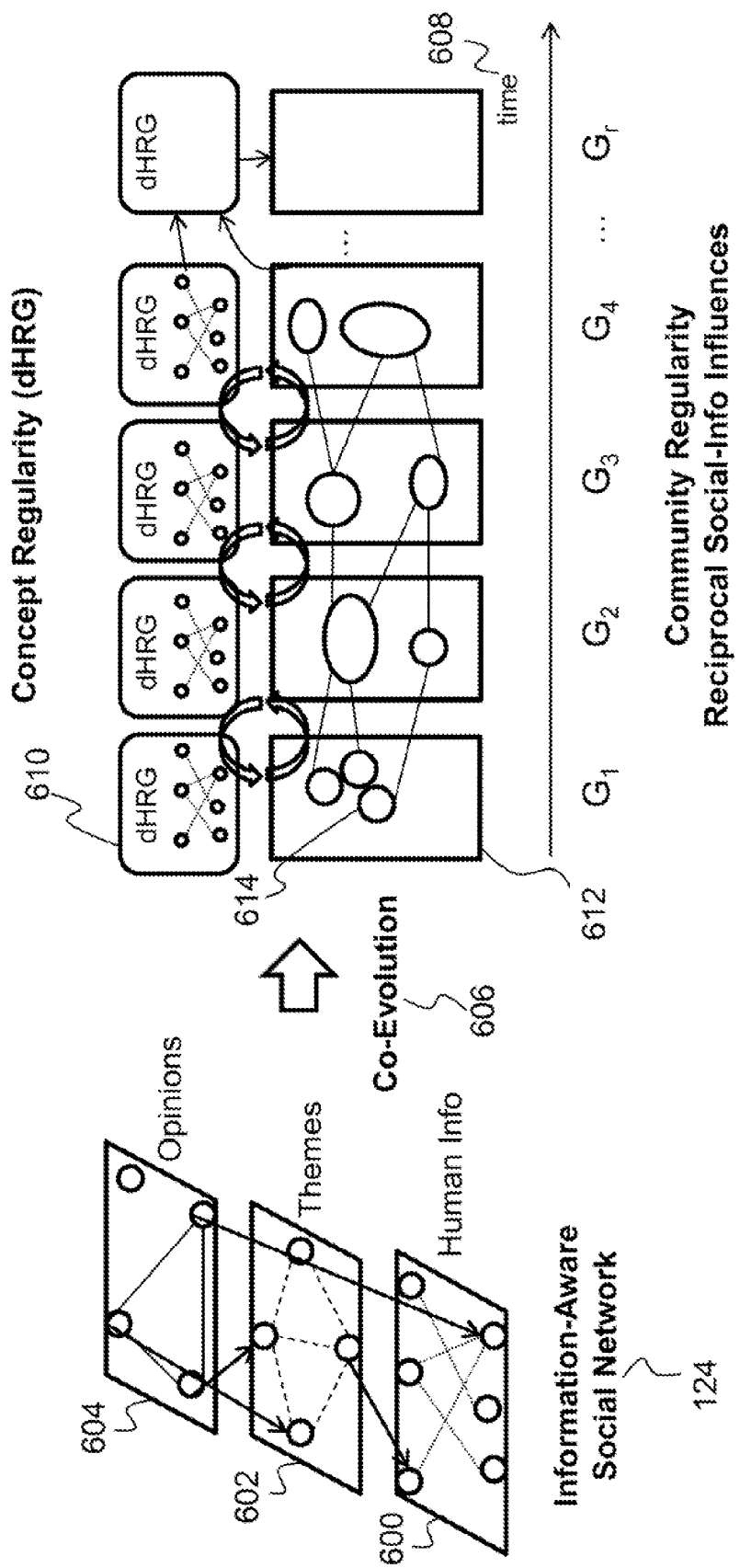
FIG. 6 is an illustration of information-aware, social networks co-evolving social relation and information exchanges according to the present invention.

An information-aware social network is used which takes the generative modeling approach (see Literature Reference No. 24) by viewing network evolution as a result of applying sequences of operators over some nodes or clusters of nodes of an initial network. As shown in the model in FIG. 6, information-aware social networks 124, comprising a hierarchy of human information (info) 600, themes 602, and opinions 604, co-evolve 606 social relation and information exchanges over time 608. In FIG. 6, G stands for graphs, and dHRG stands for dynamic hierarchical random graph. The concept hierarchy governing such changes is detected as graphs of community regularity 610 and concept regularity 612, which are described in further detail below.

As non-limiting examples, an "AddFriend" operator can change network structure by adding an edge between two person nodes; a "ShareDocument" operator can share a document among a set of receivers on the social network, which leads to updating, the function that characterizes the receivers' accessible documents; and an "ExpressOpinion" operator can broadcast one's opinion about a topic which in turns influence receivers' opinion category (e.g., friendly, hostile, or neutral). Such operators are invoked as properties of nodes evolving over time, or as responding to the actions of other nodes.

Referring to FIG. 6, to address the challenge of deriving evolution mechanisms, the discovery of community regularity 612 is provided by considering clusters 614 of nodes stably transitioned over time 608, and to discover concept regularity 610 as evolutions of hierarchy of such clusters 614. In particular, a particle-density evolutionary clustering method, such as the process described in Literature Reference No. 27, is employed to find clusters 614 in a snapshot of a dynamic network (e.g., $G_1$) and evolve them over time 608. To discover concept changes, a vector Hierarchical Random Graph model (vHRG) was developed based on prior works HRG (see Literature Reference Nos. 1 and 6) to construct hierarchical clusters (dHRG) and fit their evolution over time 608. For example, an opinion may evolve over a longer time scale to become a higher level concept, or belief, which is shared by communities. This, in turn, can influence new members joining the community or old members leaving the community. It is, therefore, essential to have an integrated modeling approach for both community evolution and concept evolution.

With such a generative framework, the present invention assists analysts in mining latent influence or evolution patterns of social networks by fitting such a generative model to an actual social network, and then computing the conditional probability of a person holding an opinion at a given time given another person holding the same opinion before the given time. Additionally, the present invention assists analysts in predicting possible actions on a social network by computing the next action given all the past actions. For example, whether two persons will likely become friends given their past actions.

Relations between nodes in social networks can be modeled as edge signs, positive (i.e., friendly), negative (i.e., hostile), or neutral interactions, which are largely influenced by nodes' roles and statuses. In real-world social networks, relations between nodes may drift over time roles and statuses may shift in response to events. Furthermore, such event- or time-induced changes in relations, roles, and statuses may propagate over the network and influence ranking on targets of interest for gaining deeper social situation awareness.

Figure 7:
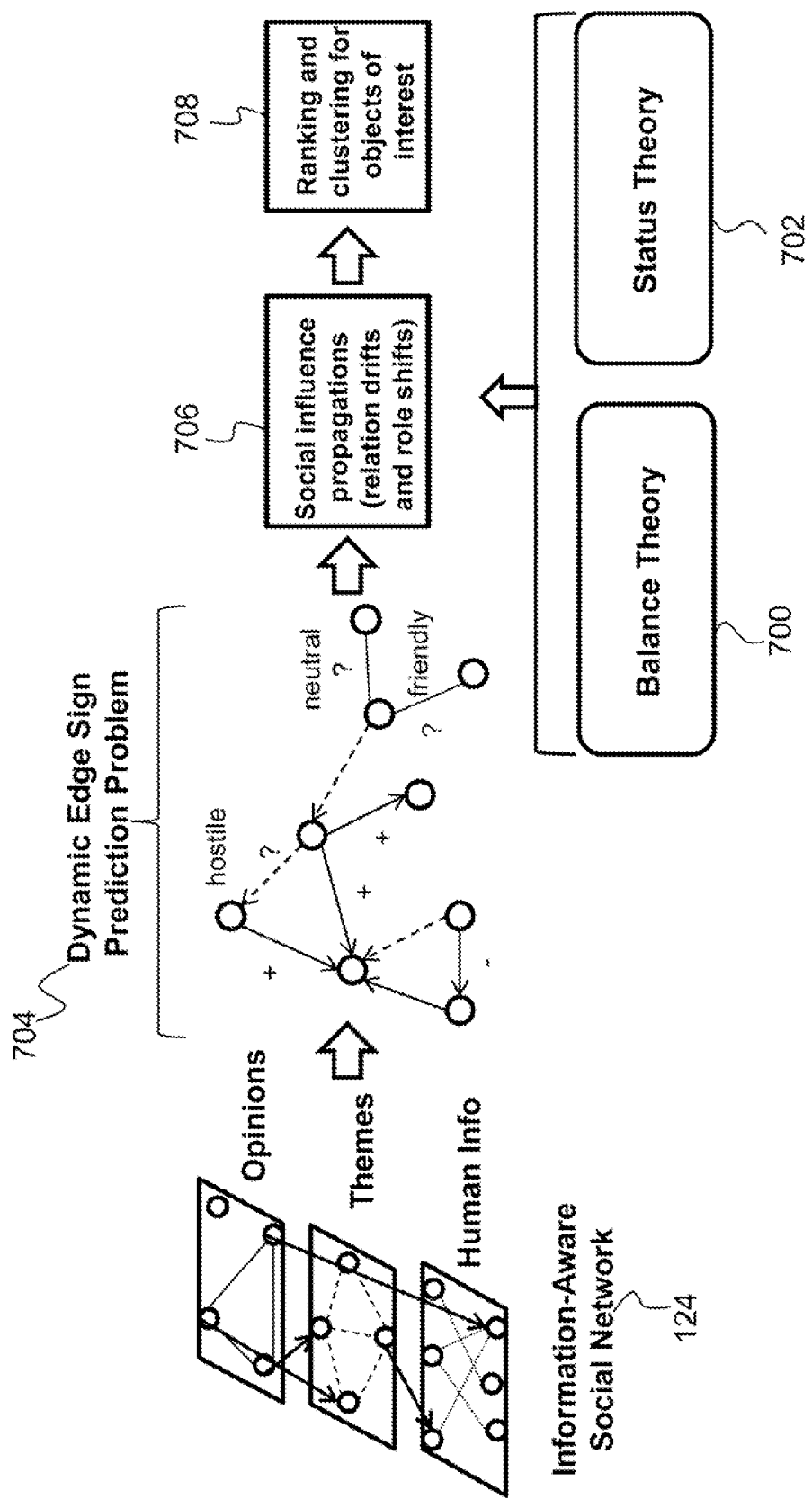
FIG. 7 is an illustration of social influence reasoning according to the present invention.

As illustrated in FIG. 7, the present invention addresses the challenges in social awareness by using social influence reasoning to identify, classify and rank objects of interest using balance theory 700 and status theory 702 with influence-passing algorithms. First, the dynamic edge sign prediction problem 704 is formalized to predict the sign the sentiment) of an existing edge or newly added edge at time t, given other edge signs in the information-aware social network 124 up to time t−1. Recently, balance theory 700 (i.e., the principle of "the friend of my friend is my friend", "the enemy of my friend is my enemy") in social psychology has been adapted and extended into status theory 702 (i.e., a positive directed link from A to B indicates that B has higher status than A, in addition to A regards B as a friend) to address directed and negative links in social media data. The edge sign prediction problem (see Literature Reference No. 11 predicts the sign (i.e., the sentiment) of an edge, given other signs in the static network. The edge sign prediction problem differs from the link prediction problem, which infers latent relationships that are present but not recorded by explicit links.

The dynamic edge sign prediction problem 704 of the present invention then predicts edge signs in dynamic networks resu king from social influence propagations 706 relations drifting, and roles or status shifts). Relation drifts are quantified by monitoring temporal distributions of exchanged information. For example, decreasing frequency of communications may indicate a fading friendship. The decreasing, frequency of communication indicating a fading, friendship may be quantified, for example, by monitoring the exchange of information as a relative difference in number of phone calls, number of e-mails, and/or number of text messages. As a non-limiting example, if one user moves from one city to another, the user may maintain the same frequency of calling his/her friends in the original city for awhile. Then, the user may gradually stop calling the friends as he/she acquires new friends in the new city. This quantification will result in an update of social influences. Stream Info Cube and frequency and stream sequential pattern mining are employed in the invention described herein to discover and characterize different types of reciprocal social-information influences observed in network data. The discovered mechanisms are used to evolve the information-aware social network 124 into the next time slice for predicting signs of exiting edges or newly added edges.

Real-world social networks often contain ambiguous information which calls for additional data acquisitions and information exploitations. In the social influence reasoning module (depicted as reference number 126 in FIG. 1), the ranked list of objects of interest is computed (i.e., ranking and clustering for objects of interest 708; depicted as reference number 132 in FIG. 11), which serves as the assessment of the current social situation. In order to gain deeper social situation awareness, more data can be acquired to add new nodes or new links to clarify edge signs inferred in the social influence reasoning module. Alternatively, additional information in the network can be exported to disambiguate the assessment of the social situation. There are both extra values and costs as new data acquisition or information exploitation is performed. It is important to prioritize and strategize such actions to maximize the value and minimize the cost.

Figure 8:
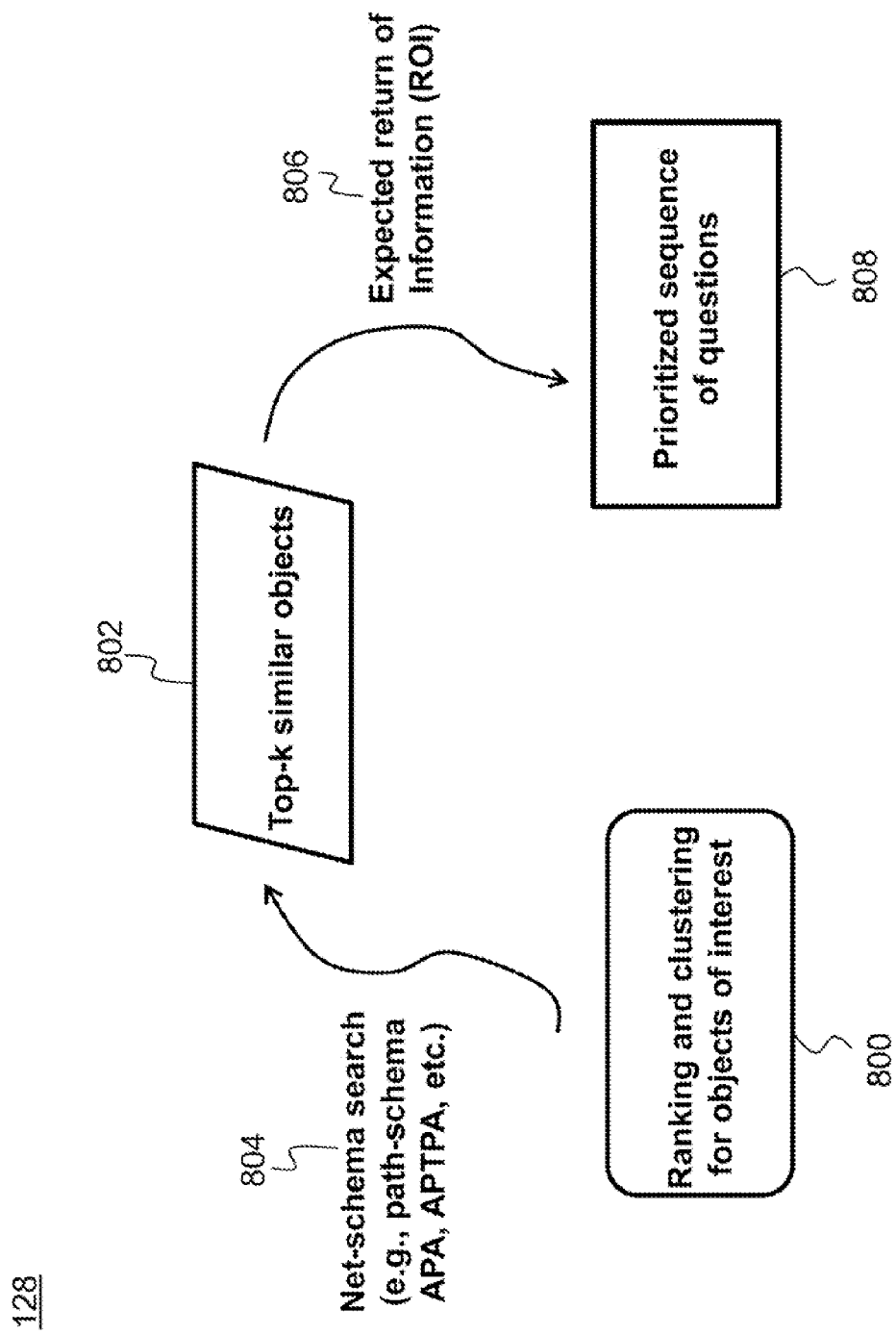
FIG. 8 is an illustration of active information acquisition according to the present invention.

FIG. 8 depicts the function of the active information acquisition module 128 of the present invention. The active information acquisition module 128 takes the ranked objects of interest 800 to search over influence-aware social networks for top-k similar objects 802 using network pattern searches, or a net-schema search 804, where the enumeration of subgraph patterns in influence-aware social networks are compared against user-provided network patterns or net-schemas. The top-k similar objects 802 are then ranked by the expected return of information (ROI) 806 to generate a prioritized sequence of questions/actions 808, such as who should be the next person to interview for a piece of valuable information. The active information acquisition module 128 was developed to provide users with the expected value of acquiring new data and exploiting information, using network pattern search with holistic decision-theoretic selective sampling. A network pattern search addresses the challenge of finding other similar objects given a specific target in terms of their semantic heterogeneity. The holistic decision-theoretic selective sampling addresses the challenge of selecting the most effective sampling of unobserved information.

In the network pattern search, the intuitive path schema-based similarity definition proposed in PathSim (see Literature Reference No. 16) was adapted. A user specifies a path schema and a sequence of relations to determine similarity scores among linked objects. Multiple path schemas are then combined to address complex queries. A non-limiting example of a path schema for bibliographic networks is P=(APA), which has the semantic meaning of studying the similarity of two authors, denoted as A, by their co-authored papers, denoted as P. The path schema guides the path selection among multiple paths between two objects. Intuitively, the more papers two authors co-authored, the more path instances following the path schema P (APA), In general, each path schema stands for a special relationship and corresponds to a particular similarity semantic. A similarity measure between two objects can then be defined as the strength, which is the number of path instances between two objects under the given path schema P, normalized by the sum of the number of paths that each object can return to themselves. In the APA example, it is the number of papers published by the author.

Built upon the success of path schema, efficient and effective target-specific network search (NPSim) mechanisms were used. The first was the development of a flexible definition of similarity function based on other network patterns (e.g., star-schema, motif-schema) to better express search preferences and constraints. The second mechanism used was the improvement of computational efficiency in finding top-k similar objects. Third, automatically derived network search patterns based on a small set of training examples were used.

As network pattern searches return a set of similar objects, there is a need for prioritizing unobserved information associated with the set to decide which piece of information to acquire next in order to maximally improve situation awareness with least cost. Decision-theoretic selective sampling criterion (see Literature Reference No. 26) is employed to maximize the expected return of information (ROI). ROI is defined as maximizing the information gain per unit cost. The entropy for quantifying the uncertainty is conditioned by a network pattern used in search for similar objects. Such target-specific uncertainty quantification provides local and relevant context. The information gain is then defined as the expected reduction in uncertainty of attributes and relations between the given target and each of the similar objects.

Due to time- or event-driven dynamics in a real-world social network, acquired data or inferred information may become invalid over time, or become information again with switches in context. Therefore, the principle of "forgetting" and "remembering" of acquired data or inferred information in the context of active information acquisition for social networks was investigated. For each piece of data and information in the social network, the present invention annotates them with time-stamped events, non-limiting examples of which include time of acquisitions, time of usage in social influence reasoning, and time, of usage in network pattern search. With this time-stamped information, there is temporal distribution of how often such a piece of data is used and under what context. This enables computation of the value of caching (i.e., forgetting and storing the data for future) and value of recalling. (i.e., remembering discarded data), which can be further incorporated into decision-theoretic selective sampling for prioritizing what data to gather next.

Figure 9:
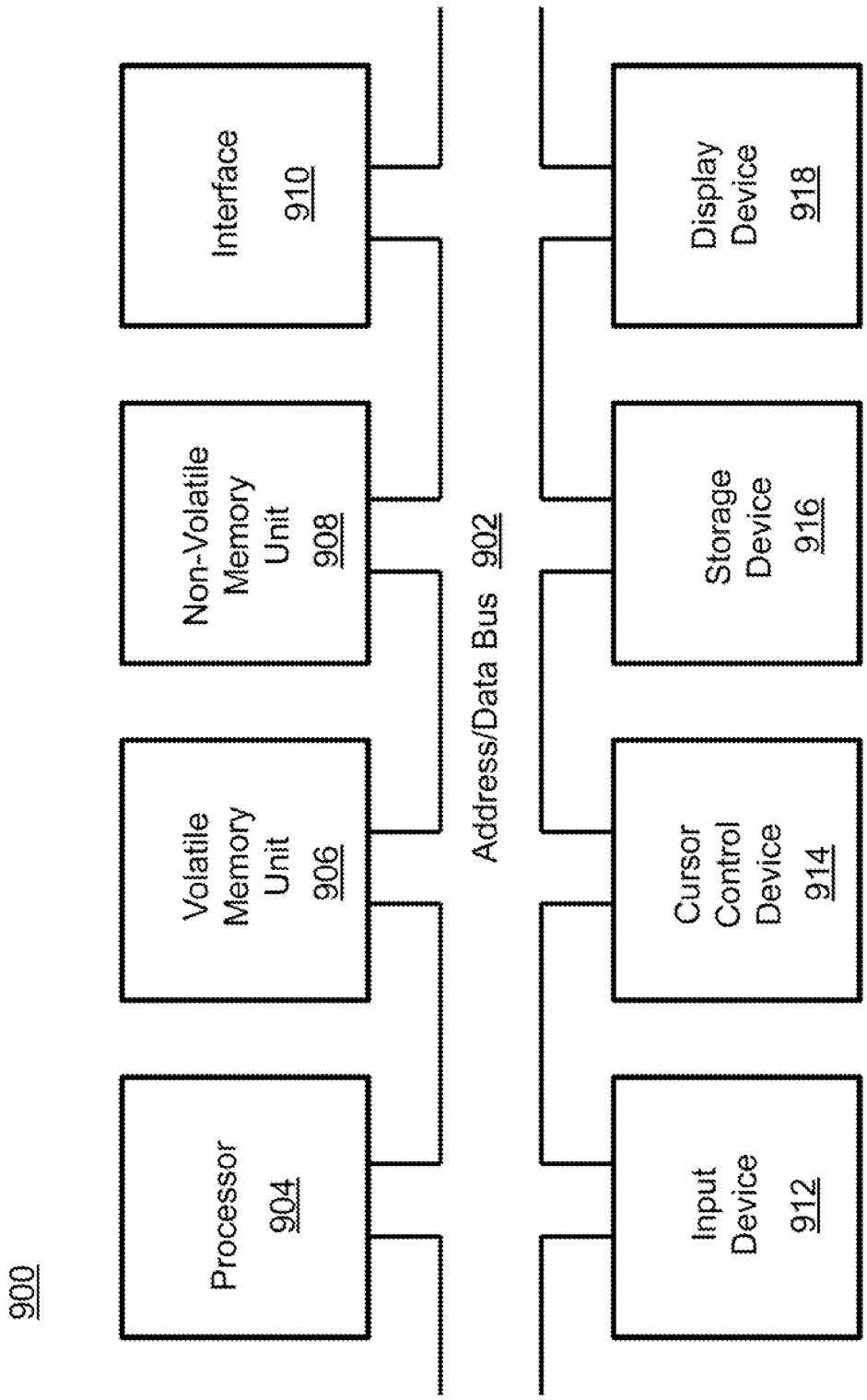
FIG. 9 is an illustration of a data processing system according to the present invention.

An example of a computer system 900 in accordance with one aspect is shown in FIG. 9. The computer system 900 is configured to perform calculations, processes, operations, and/or functions associated with a program or algorithm. In one embodiment, certain processes and steps discussed herein are realized as a series of instructions (e.g., software program) that reside the in computer readable memory units and are executed by one or more processors of the computer system 900. When executed, the instructions cause the computer system 900 to perform specific actions and exhibit specific behavior, such as described herein.

The computer system 900 may include an address/data bus 902 that is configured to communicate information. Additionally, one or more data processing units, such as a processor 904, are coupled with the address/data bus 902. The processor 904 is configured to process information and instructions. In one aspect, the processor 904 is a microprocessor. Alternatively, the processor 904 may be a different type of processor such as a parallel processor, or a field programmable gate array.

The computer system 900 is configured to utilize one or more data storage units. The computer system 900 may include a volatile memory unit 906 (e.g., random access memory ("RAM"), static RAM, dynamic RAM, etc.) coupled with the address/data bus 902, wherein a volatile memory unit 906 is configured to store information and instructions for the processor 904. The computer system 900 further may include a non-volatile memory unit 908 e.g., read-only memory ("ROM"), programmable ROM ("PROM"), erasable programmable ROM ("EPROM"), electrically erasable programmable ROM "EEPROM"), flash memory, etc.) coupled with the address/data bus 902, wherein the non-volatile memory unit 908 is configured to store static information and instructions for the processor 904. Alternatively, the computer system 900 may execute instructions retrieved from an online data storage unit such as in "Cloud" computing, in an embodiment, the computer system 900 also may include one or more interfaces, such as an interface 910, coupled with the address/data bus 902. The one or more interfaces are configured to enable the computer system 900 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 900 may include an input device 912 coupled with the address/data bus 902, wherein the input device 912 is configured to communicate information and command selections to the processor 900. In accordance with one embodiment, the input device 912 is an alphanumeric input device, such as a keyboard, that may include alphanumeric and/or function keys. Alternatively, the input device 912 may be an input device other than an alphanumeric input device. In one aspect, the computer system 900 may include a cursor control device 914 coupled with the address/data bus 902, wherein the cursor control device 914 is configured to communicate user input information and/or command selections to the processor 900. In one aspect, the cursor control device 914 is implemented using a device such as a mouse, a track-ball, a track-pad, an optical tracking device, or a touch screen. The foregoing notwithstanding, in one aspect, the cursor control device 914 is directed and/or activated via input from the input device 912, such as in response to the use of special keys and key sequence commands associated with the input device 912. In an alternative aspect, the cursor control device 914 is configured to be directed or guided by vice commands.

In one aspect, the computer system 900 further may include one or more optional computer usable data storage devices, such as a storage device 916, coupled with the address/data bus 902. The storage device 916 is configured to store information and/or computer executable instructions. In one aspect, the storage device 916 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 918 is coupled with the address/data bus 902, wherein the display device 918 is configured to display video and/or graphics. In one aspect, the display device 918 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 900 presented herein is an example computing environment in accordance with one aspect. However, the non-limiting example of the computer system 900 is not strictly limited to being a computer system. For example, one aspect provides that the computer system 900 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory, storage devices.

An illustrative diagram of a computer program product embodying the present invention is depicted in FIG. 10. As a non-limiting example, the computer program product is depicted as either a floppy disk 1000 or an optical disk 1002.

However, as mentioned previously, the computer program product generally represents computer readable code (i.e., instruction means or instructions) stored on any compatible non-transitory computer readable medium.

What is claimed is:

1. A system for supporting human intelligence (HUMINT) analysis, the system comprising:
   one or more processors and a memory having instructions such that when the instructions are executed, the one or more processors perform operations of:
      detecting changes in a plurality of social relations among users within a dynamic information network comprising a plurality of data; and
      enabling understanding of a current social situation in the dynamic information network through a plurality of integrated modules, wherein the plurality of integrated modules comprises:
         an active network mining module, wherein the active network mining module identifies incomplete data that is related to at least one change in the plurality of social relations, and wherein the active network mining module further resolves conflicting and missing data in the dynamic information network to derive a set of trustworthiness relations using link analysis;
         a relevant network discovery module, wherein the relevant network discovery module constructs a relevant network, comprising nodes and clusters of nodes, from hidden relations within the dynamic information network;
         an information-aware social network module for constructing an information aware social network using the relevant network, wherein the information-aware social network comprises a plurality of items of interest, and wherein the information-aware social network module further classifies and prioritizes the plurality of items of interest to provide an assessment of a current social situation to a user;
         wherein a node is associated with a set of perceived importance scores and a set of rank scores;
         wherein the active network mining module utilizes an information imbalance measure to prioritize data for efficient data collection; and
      computing the information imbalance measure of the node from the set of received importance scores of the node and the set of rank scores of the node, wherein the information imbalance measure reflects an inconsistency within and between the set of perceived importance scores of the node and the set of rank scores of the node.

2. The system as set forth in claim 1, wherein the plurality of integrated modules further comprises a storage and query module to enable efficient data querying and summarization, wherein the storage and query module comprises:
   a graph-enhanced database for storing the dynamic information network; and
   a multi-dimensional information cube model integrating text data and graphical data from the dynamic information network.

3. The system as set forth in claim 2, wherein the one or more processors further perform operations of:
   querying and extracting a set of perceived importance scores of a node from the multi-dimensional information cube model; and
   querying and extracting a set of rank scores of the node from the multi-dimensional information cube model.

4. The system as set forth in claim 3, wherein the one or more processors further perform operations of:
   employing a mode-switching model for trust and confidence analysis, Wherein the Mode-switching model comprises a network of linked nodes and network edges, and wherein the network edges represent instances of truth telling behaviors or instances of lying behaviors;
   deriving initial weights on a trustworthiness of linked nodes using the set of perceived importance scores and the set of rank Scores;
   assigning negative weights to linked nodes corresponding, to lying behaviors;
   assigning positive weights to linked nodes corresponding to truth telling behaviors; and
   propagating the weights and consolidating the trustworthiness by an iterative enhancement process.

5. The system as set forth in claim 4, wherein the relevant network discovery module utilizes a role discovery algorithm to perform simultaneous clustering and ranking to identify which clusters of nodes and nodes are most relevant based on their ranking within a cluster.

6. The system as set forth in claim 5, wherein the information-aware social network module comprises:
   an information-aware social network which views network evolution as a result of applying a sequence of operators over sonic nodes or clusters of an initial network;
   a social influence reasoning sub-module to identify, classify, and rank items of interest by considering relation drifts between the items of interest using a social influence propagation algorithm, wherein relation drifts are quantified by monitoring temporal distributions of exchanged information; and
   an active information acquisition sub-module for providing an expected value of acquiring new data and exploiting information using network pattern search with holistic decision-theoretic selective sampling.

7. A computer-implemented method for supporting human intelligence, comprising an act of:
   causing a data processor to execute instructions stored on a non-transitory memory such that upon execution, the data processor performs operations of:
      detecting changes in a plurality of social relations among users within a dynamic information network comprising a plurality of data; and
      enabling, understanding, of a current social situation in the dynamic information network through a plurality of integrated modules, wherein the plurality of integrated modules comprises:
         an active network mining module, wherein the active network mining module identifies incomplete data that is related to at least one change in the plurality of social relations, and wherein the active network mining module further resolves conflicting and missing data in the dynamic information network to derive a set of trustworthiness relations using link analysis;
         a relevant network discovery module, wherein the relevant network discovery module constructs a relevant network, comprising, nodes and clusters of nodes, from hidden relations within the dynamic information network;
         an information-aware social network module for constructing an information-aware social network using the relevant network, wherein the information-aware social network composes a plurality of items of interest, and wherein the information-aware social network module further classifies and prioritizes the plurality of items of interest to provide an assessment of a current social situation to a user;

wherein a node is associated with a set of perceived importance scores and a set of rank scores;

wherein the active network mining module utilizes an information imbalance measure to prioritize data for efficient data collection; and computing the information imbalance measure of the node from the set of perceived importance scores of the node and the set of rank scores of the node, wherein the information imbalance measure reflects an inconsistency within and between the set of perceived importance scores of the node and the set of rank scores of the node.

8. The method as set forth in claim 7, further comprising an act of a enabling efficient data querying and summarization with a storage and query module, wherein the storage and query module comprises:

a graph-enhanced database for storing the dynamic information network; and a multi-dimensional information cube model integrating text data and graphical data from the dynamic information network.

9. The method as set forth in claim 8, further comprising acts of:

querying and extracting a set of perceived importance scores of a node from the multi-dimensional information cube model; and querying and extracting a set of rank scores of the node from the multi-dimensional information cube model.

10. The method as set forth in claim 9, further comprising an act of causing the data processor to perform an operations of:

employing a mode-switching model for trust and confidence analysis, wherein the mode-switching model comprises a network of linked nodes and network edges, and wherein the network edges represent instances of truth telling behaviors or instances of lying behaviors;

deriving, initial weights on a trustworthiness of linked nodes using the set of perceived importance scores and the set of rank scores;

assigning negative weights to linked nodes corresponding, to lying behaviors;

assigning positive weights to linked nodes corresponding to truth telling behaviors; and propagating the weighs and consolidating the trustworthiness by an iterative enhancement process.

11. The method as set forth in claim 10, wherein the relevant network discovery module utilizes a role discovery algorithm to perform simultaneous clustering and ranking to identify which clusters of nodes and nodes are most relevant based on their ranking within the cluster.

12. The method as set forth in claim 11 further comprising acts of:

viewing network evolution as a result of applying a sequence of operators over some nodes or clusters of an initial network;

identifying, classifying, and ranking items of interest by considering relation drills between the items of interest using a social influence propagation algorithm, wherein relation drifts are quantified by monitoring temporal distributions of exchanged information; and providing an expected value of acquiring new data and exploiting information using network pattern search with holistic decision-theoretic selective sampling.

13. A computer program product for supporting human intelligence analysis, the computer program product comprising computer-readable instructions stored on a non-transitory computer-readable medium that are executable by a computer having, a processor for causing the processor to perform operations of:

detecting changes in a plurality of social relations among users within a dynamic information network comprising a plurality of data; and enabling understanding of a current social situation in the dynamic information network through a plurality of integrated modules, wherein the plurality of integrated modules comprises:

an active network mining module, wherein the active network mining module identifies incomplete data that is related to at least one change in the plurality of social relations, and wherein the active network mining module further resolves conflicting and missing data in the dynamic information network to derive a set of trustworthiness relations using link analysis;

a relevant network discovery module, wherein the relevant network discovery module constructs a relevant network, comprising nodes and clusters of nodes, from hidden relations within the dynamic information network;

an information-aware social network module for constructing an information-aware social network using the relevant network, Wherein the information-aware social network comprises a plurality of items of interest, and wherein the information-aware social network module further classifies and prioritizes the plurality of items of interest to provide an assessment of a current social situation to a user;

wherein a node is associated with a set of perceived importance scores and a set of rank scores;

wherein the active network mining module utilizes an information imbalance measure to prioritize data for efficient data collection; and computing the information imbalance measure of the node from the set of perceived importance scores of the node and the set of rank scores of the node, wherein the information imbalance measure reflects an inconsistency within and between the set of perceived importance scores of the node and the set of rank scores of the node.

14. The computer program product as set forth in claim 13, further comprising instructions for enabling efficient data querying and summarization with a storage and query module, wherein the storage and query module comprises:

a graph-enhanced database for storing the dynamic information network; and a multi-dimensional information cube model integrating text data and graphical data from the dynamic information network.

15. The computer program product as set forth in claim 14, further comprising instruction means for:

querying and extracting a set of perceived importance scores of a node from the multi-dimensional information cube model; and querying and extracting a set of rank scores of the node from the multi-dimensional information cube model.

16. The computer program product as set forth in claim 15, further comprising instructions for:

employing a mode-switching model for trust and confidence analysis, wherein the mode switching model comprises a network of linked nodes and network edges, and wherein the network edges represent instances of truth telling behaviors or instances of lying behaviors;

deriving initial weights on a trustworthiness of linked nodes using the set of perceived importance scores and the set of rank scores;

assigning negative weights to linked nodes corresponding to N mg behaviors, assigning positive weights to linked nodes corresponding to truth telling behaviors; and propagating the weights and consolidating the trustworthiness by an iterative enhancement process.

17. The computer program product as set forth in claim 16, wherein the relevant network discovery module utilizes a role discovery algorithm to perform simultaneous clustering and ranking to identify which clusters of nodes and nodes are most relevant based on their ranking within the cluster.

18. The computer program product as set forth in claim 17, further comprising instructions for:

viewing network evolution as a result of applying a sequence of operators over some nodes or clusters of an initial network;

identifying, classifying, and ranking items of interest by considering relation drifts between the items of interest using a social influence propagation algorithm, wherein relation drifts are quantified by monitoring temporal distributions of exchanged information; and providing an expected value of acquiring new data and exploiting information using network pattern search with holistic decision-theoretic selective sampling.

* * * * *